US008966111B2

(12) United States Patent
Chen et al.

(10) Patent No.: US 8,966,111 B2
(45) Date of Patent: Feb. 24, 2015

(54) METHODS AND APPARATUS FOR SERVICE PLANNING AND ANALYSIS

(75) Inventors: An Mei Chen, San Diego, CA (US); Ravinder Paul Chandhok, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1505 days.

(21) Appl. No.: 11/373,641

(22) Filed: Mar. 9, 2006

(65) Prior Publication Data

US 2006/0230173 A1    Oct. 12, 2006

Related U.S. Application Data

(60) Provisional application No. 60/660,740, filed on Mar. 10, 2005.

(51) Int. Cl.
*G06F 15/16* (2006.01)
*H04L 29/08* (2006.01)

(52) U.S. Cl.
CPC .................................. *H04L 67/325* (2013.01)
USPC ........... 709/235; 709/231; 709/232; 709/226; 709/204; 709/206

(58) Field of Classification Search
CPC ....... H04L 67/325; H04L 47/10; H04L 29/06; H04L 29/06095
USPC .......................... 709/231, 232, 226, 204–206
See application file for complete search history.

(56) References Cited

U.S. PATENT DOCUMENTS

| | | | | |
|---|---|---|---|---|
| 5,594,911 A | * | 1/1997 | Cruz et al. | 709/204 |
| 6,594,682 B2 | * | 7/2003 | Peterson et al. | 718/102 |
| 6,625,647 B1 | * | 9/2003 | Barrick et al. | 709/224 |
| 6,965,913 B2 | * | 11/2005 | Levitan | 709/203 |
| 6,973,490 B1 | * | 12/2005 | Robertson et al. | 709/224 |
| 6,988,144 B1 | * | 1/2006 | Luken et al. | 709/231 |
| 7,065,778 B1 | * | 6/2006 | Lu | 725/98 |
| 7,403,994 B1 | * | 7/2008 | Vogl et al. | 709/227 |
| 7,424,535 B2 | * | 9/2008 | Karaoguz et al. | 709/226 |
| 2002/0091658 A1 | * | 7/2002 | Bae | 706/62 |

(Continued)

FOREIGN PATENT DOCUMENTS

WO    2004/0091172 A1    10/2004

OTHER PUBLICATIONS

Homan,P. et al: "FPCF Input-Queued Packet Switch for Variable-Size Packets" LNCS, vol. 2094, Jul. 9, 2001. Jul. 13, 2001, pp. 348-357.

(Continued)

*Primary Examiner* — Khaled Kassim
(74) *Attorney, Agent, or Firm* — The Marbury Law Group, PLLC

(57) ABSTRACT

Methods and apparatus for service planning and analysis. In an aspect, a method is provided for scheduling a presentation for delivery over a distribution network. The method comprises generating a contact window that comprises a selected time duration, performing an allocation cycle to allocate the presentation to the contact window, determining whether the presentation can be allocated, adjusting the selected time duration of the contact window if the presentation cannot be allocated, and repeating said performing, determining and adjusting until the presentation can be allocated.

24 Claims, 14 Drawing Sheets

(56) References Cited

U.S. PATENT DOCUMENTS

| | | | |
|---|---|---|---|
| 2002/0138352 A1* | 9/2002 | DeMaggio | 705/22 |
| 2002/0143952 A1 | 10/2002 | Sugiarto et al. | |
| 2002/0161913 A1 | 10/2002 | Gonzalez et al. | |
| 2003/0045273 A1* | 3/2003 | Pyhalammi et al. | 455/412 |
| 2003/0167337 A1* | 9/2003 | Liew et al. | 709/231 |
| 2004/0215805 A1* | 10/2004 | Tan et al. | 709/231 |
| 2005/0080904 A1* | 4/2005 | Green | 709/227 |
| 2006/0020665 A1* | 1/2006 | Hagale et al. | 709/204 |
| 2006/0209694 A1* | 9/2006 | Chandhok et al. | 370/235 |
| 2006/0265524 A1* | 11/2006 | Fricke et al. | 710/33 |

OTHER PUBLICATIONS

International Search Report and Written Opinion—PCT/US2006/008771, International Search Authority—European Patent Office—Jun. 7, 2006.

Taiwan Search Report—TW095108328—TIPO—Jun. 18, 2012.

* cited by examiner

METHODS AND APPARATUS FOR SERVICE PLANNING AND ANALYSIS

CLAIM OF PRIORITY UNDER 35 U.S.C. §119

The present application for patent claims priority to Provisional Application No. 60/660,740 entitled "A METHOD AND APPARATUS FOR A SERVICE PLANNING AND ANALYSIS" filed Mar. 10, 2005, and assigned to the assignee hereof and hereby expressly incorporated by reference herein.

BACKGROUND

1. Field

The present Application relates generally to the operation of data networks, and more particularly, to methods and apparatus for service planning and analysis.

2. Background

Data networks, such as wireless communication networks, have to trade off between services customized for a single terminal and services provided to a large number of terminals. For example, the distribution of content to a large number of mobile terminals (subscribers) is a complicated problem. This is especially true for mobile terminals that communicate using relatively slow speed over-the-air communication links. Therefore, it is very important for content providers to have a way to efficiently deliver content to a variety of mobile terminals.

In current content delivery/media distribution systems, content providers deliver presentations over a network resource. However, due to network loading there may be a varying amount of bandwidth available with which to deliver presentations. Typically, devices contact the distribution system to obtain selected presentations. However, when a large number of devices attempt to obtain content at the same time, various scheduling problems occur. For example, a device may be unsuccessful in obtaining a presentation if there is not enough bandwidth to deliver it. Because current delivery systems fail to account for network loading, the number of devices in the system, the number of presentations to be supported, and other network characteristics, the network may delivery poor performance and waste bandwidth.

Therefore, what is needed is a system that operates to flexibly and efficiently schedule content for delivery to devices over a distribution network, wherein factors such as the number of services to be supported, the number of subscribers, network loading, and other network characteristics are accounted for.

SUMMARY

In one or more embodiments, a service planning and analysis (SPA) system is provided that operates to provide a flexible and efficient system for the planning, scheduling, and delivery of content over a distribution network.

In an aspect, a method is provided for scheduling a presentation for delivery over a distribution network. The method comprises generating a contact window that comprises a selected time duration, performing an allocation cycle to allocate the presentation to the contact window, determining whether the presentation can be allocated, adjusting the selected time duration of the contact window if the presentation cannot be allocated, and repeating said performing, determining and adjusting until the presentation can be allocated.

In another aspect, an apparatus is provided for scheduling a presentation for delivery over a distribution network. The apparatus comprises logic configured to determine one or more parameters. The apparatus also comprises logic configured to process the one or more parameters to perform a method comprising: generating a contact window that comprises a selected time duration; performing an allocation cycle to allocate the presentation to the contact window; determining whether the presentation can be allocated; adjusting the selected time duration of the contact window if the presentation cannot be allocated; and repeating said performing, determining and adjusting until the presentation can be allocated.

In another aspect, an apparatus is provided for scheduling a presentation for delivery over a distribution network. The apparatus comprises means for generating a contact window that comprises a selected time duration, and means for performing an allocation cycle to allocate the presentation to the contact window. The apparatus also comprises means for determining whether the presentation can be allocated, and means for adjusting the selected time duration of the contact window if the presentation cannot be allocated. The apparatus also comprises means for repeating said performing, determining and adjusting until the presentation can be allocated.

In another aspect, a computer-readable medium is provided that has a computer program, which when executed by at least one processor, operates to schedule a presentation for delivery over a distribution network. The computer program comprises instructions for generating a contact window that comprises a selected time duration, and instructions for performing an allocation cycle to allocate the presentation to the contact window. The computer program also comprises instructions for determining whether the presentation can be allocated, instructions for adjusting the selected time duration of the contact window if the presentation cannot be allocated, and instructions for repeating said performing, determining and adjusting until the presentation can be allocated.

In another aspect, at least one processor is provided that is configured to perform a method for scheduling a presentation for delivery over a distribution network. The method comprises generating a contact window that comprises a selected time duration, and performing an allocation cycle to allocate the presentation to the contact window. The method also comprises determining whether the presentation can be allocated, adjusting the selected time duration of the contact window if the presentation cannot be allocated, and repeating said performing, determining and adjusting until the presentation can be allocated.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DETAILED DESCRIPTION

In one or more embodiments, a service planning and analysis (SPA) system is provided that operates to provide a flexible and efficient system for the planning, scheduling, and delivery of content over a distribution network to authorized devices. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Figure 1:
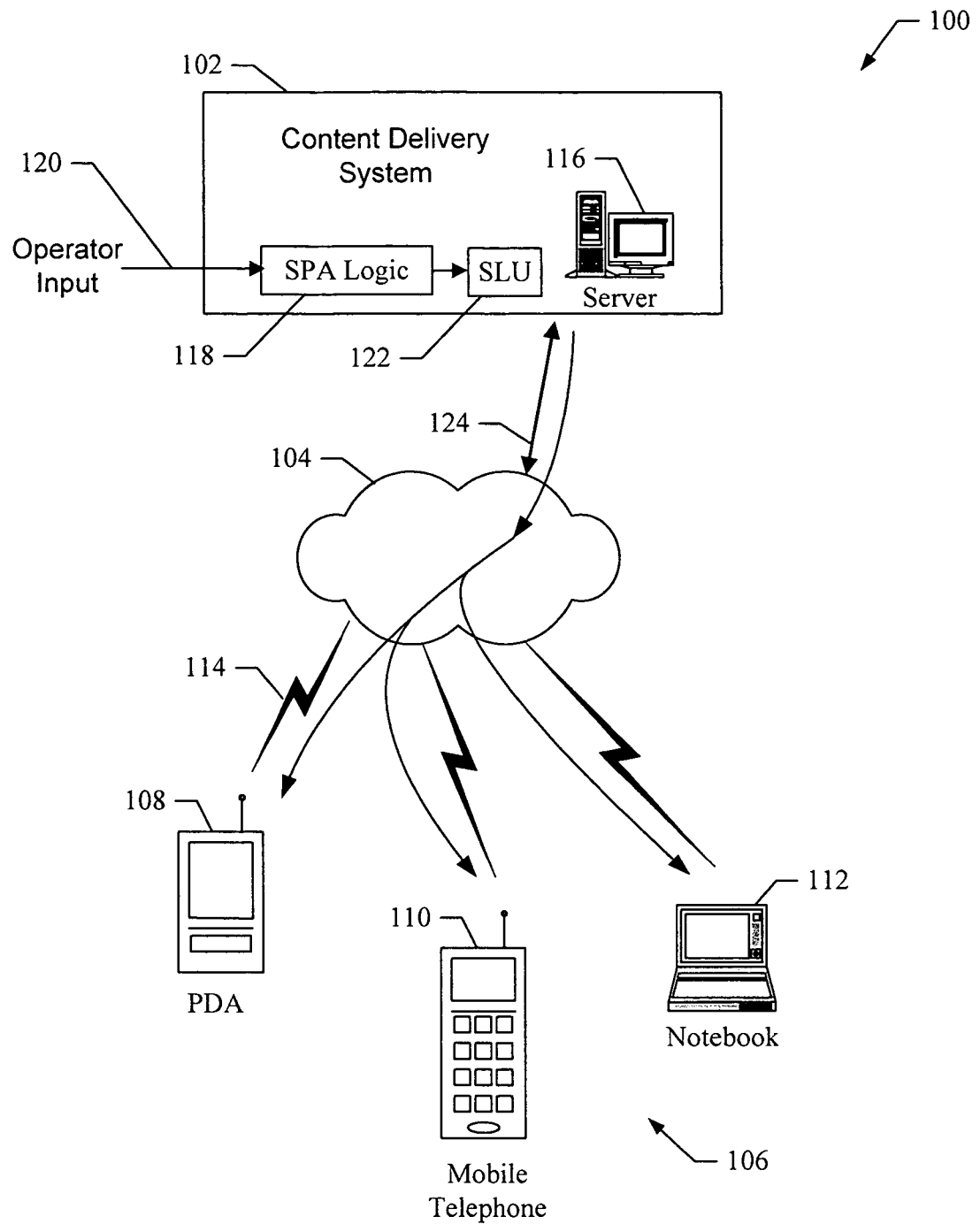
FIG. 1 shows a network that comprises one embodiment of a SPA system.

FIG. 1 shows a network 100 that comprises one embodiment of a SPA system. The network 100 comprises a content delivery system 102 that operates to distribute content over a distribution network 104. In one embodiment, the content delivery system 102 delivers content in the form of presentations that are associated with one or more services. The network 104 may comprise any type of wired and/or wireless networks. The network 104 is in communication with various devices 106. For example the devices 106 comprise a PDA 108, a mobile telephone 110, and a notebook computer 112. The network 104 communicates with the devices 106 using wireless communication links 114 which may comprise any suitable wireless communication technology. Thus, the distribution network 104 is operable to deliver content to authorized devices, which may comprise any type or number of authorized devices.

The content delivery system 102 comprises one or more servers, including server 116, which operate to deliver content in the form of scheduled presentations over the network 104. For example, the content delivery system communicates with the network using the communication link 124, which comprises any suitable type of communication technology. The content delivery system also comprises SPA logic 118, which operates to provide service planning and analysis to allow the content delivery system 102 to plan, schedule and deliver content over the network 104 in an efficient manner.

In one embodiment, the SPA logic 118 provides a central point for planning the delivery of content. Embodiments of the SPA logic 118 provide the following three main functions:
1. Scheduling presentations associated with a service
2. Computing the total memory required for a service
3. Deriving an availability duration for a presentation.

Using the SPA logic 118, an operator can determine how many services can be supported by the network 104 and generate a contact window for each scheduled presentation associated with a service. For example, the contact window defines a time interval wherein content is available to authorized devices on the network 104. In one embodiment, the contact window is sent to the devices 106 through a system information update. Thus, a subscribed device uses the contact window to determine when to contact the network 104 to retrieve a selected presentation. In one embodiment, the SPA logic 118 contains a content delivery scheduling algorithm for scheduling presentations and deriving associated contact windows. A more detailed description of the scheduling algorithm is provided in another section of this document.

In one embodiment, the SPA logic 118 computes the total amount of memory required on a device in order for the device user to subscribe to a service. The computation takes into consideration whether presentation buffering is required. The memory requirements are also sent to the devices 106, so each device can determine if it has sufficient memory to proceed with subscription of a service. In one embodiment, the SPA logic 118 computes an availability duration value that indicates how long a presentation will remain available for user viewing.

In one embodiment, the SPA logic 118 operates in a non-networked mode to allow an operator to do what-if scenarios by performing trade-offs, such as between the number of available services and the number of content updates per day, and to determine which scenario best achieves a desired system performance, service model, and/or revenue point.

In one embodiment, the SPA logic 118 receives inputs from an operator through an operator input 120 and outputs a Service Line-Up (SLU) 122. The SLU 122 contains a list of services along with the number of presentations that can be scheduled for each service and a contact window for each presentation. Once the operator is satisfied with the SLU 122, the operator can save it, and specify the time at which the new SLU becomes effective.

Embodiments of the SPA logic 118 can be used to do initial service planning before the content delivery system service is deployed. Also, it can be used at a later time to determine whether a new service can be added without impacting existing services that already have subscribers. In addition, an operator can use the SPA logic 118 to modify the content update schedule of services already in the system.

In one embodiment, the SPA logic 118 operates in two modes as follows.
1. Non-Network mode
2. Network mode In the non-network mode, the SPA logic 118 is disconnected from the content delivery system 102, and does not rely on any information provisioned by the content delivery system 102. An operator inputs data to run the SPA logic 118 and any SLU output from the SPA logic 118 is locally saved.

In the network mode, the SPA logic 118 has a connection to the content delivery system 102 and is reading and writing information to a delivery system database (not shown). In this mode, an operator can save a SLU in the database or read an existing SLU from the database.

In one embodiment, an operator can run the SPA logic 118 in a non-network mode (i.e., off-line) while planning the services to be provided by the content delivery system 102. Once an operator is satisfied with a SLU that is generated, an operator can connect the SPA logic 118 to the content delivery system 102 and commit the SLU into the database.

In another embodiment, the operator can initially connect the SPA logic 118 to the content delivery system 102 in order to retrieve an existing SLU. After the SLU has been retrieved, an operator can use the SPA logic 118 in the non-network mode to study what-if scenarios, or otherwise change or modify the SLU to generate a new SLU.

In one embodiment, the SPA logic 118 uses the operator input 120 to allow an operator to input parameters that are used to generate a SLU. These parameters may be in any suitable format and are classified as "Global parameters" and "Service-specific" parameters, as indicated below.

Global Parameters
- Average forward link sector throughput—this is the average amount of forward link capacity per sector for a single antenna receiver.
- Percentage of non-content delivery system traffic utilization—the percentage of sector capacity used by non-content delivery system traffic. This factor is entered for each hour of the day. The unused percentage is the amount of sector capacity available for content delivery system use.
- Number of sectors—the total number of sectors serving the content delivery system service.
- Service ID's—identifies the services in the content delivery system
- Service Rank List—a list of services ranked in order
- Service Line-Up effective time—the time at which an SLU becomes effective.

Service-Specific Parameters
- Number of projected subscribers—the projected number of content delivery system subscribers for a service.
- Maximum presentation size—the maximum size of the presentation in Kbytes, This value is entered for each presentation.
- Presentation viewing time—the time at which a content delivery system Program Guide (PG) advertises that a presentation is available for viewing. This value is entered for each presentation.
- Presentation deadline time—the time at which the content is available at the content server for delivery to authorized devices. This value is entered for each presentation.
- Fetch Deadline time—the time value (in minutes) used to calculate the presentation deadline time by decreasing the fetch deadline time from the presentation viewing time In one embodiment, the amount of "non-content delivery system traffic" sector utilization is entered for every hour for a 24-hour period. An operator may obtain this information from a wireless system operator. Presentation information is entered for any time period, for example, a 7-day, 30-day, 6 month, or one year time period.

The SPA logic 118 uses the information entered by the operator to generate the SLU 122. In one embodiment, the SLU 122 comprises the following information.
- Contact window start time—the time at which the device can contact the network to download a Presentation. This value is provided for each scheduled presentation. For an unscheduled presentation, the contact window start time to zero.
- Contact window duration—the time interval during which the device can contact the network to download the presentation. This value is provided for each scheduled presentation. For an unscheduled presentation, the contact window duration is set to zero.
- Subscribed memory—the amount of memory required to subscribe to a service. In one embodiment, the amount of memory is determined only for presentations that are successfully scheduled.
- Presentation availability duration—the time interval during which a presentation is available for viewing. This value is provided for each presentation. For an unscheduled presentation, the presentation availability duration is set to zero.

In addition to above outputs, the SLU 122 contains all the input parameters as well. The input parameters are maintained in case an operator wants to re-load an existing SLU and modify any of the input parameters to do what-if studies.

Thus, embodiments of the SPA system operate to allow a SLU to be generated, stored, modified, activated, or used to provide what-if scenarios. The SLU is used by a content delivery system to deliver scheduled content over a distribution network to authorized devices. Thus, the SPA system operates to provide a flexible and efficient system for the planning, scheduling, and delivery of content over a distribution network. It should be noted that the network 100 illustrates just one implementation and that other implementations are possible within the scope of the embodiments.

Figure 2:
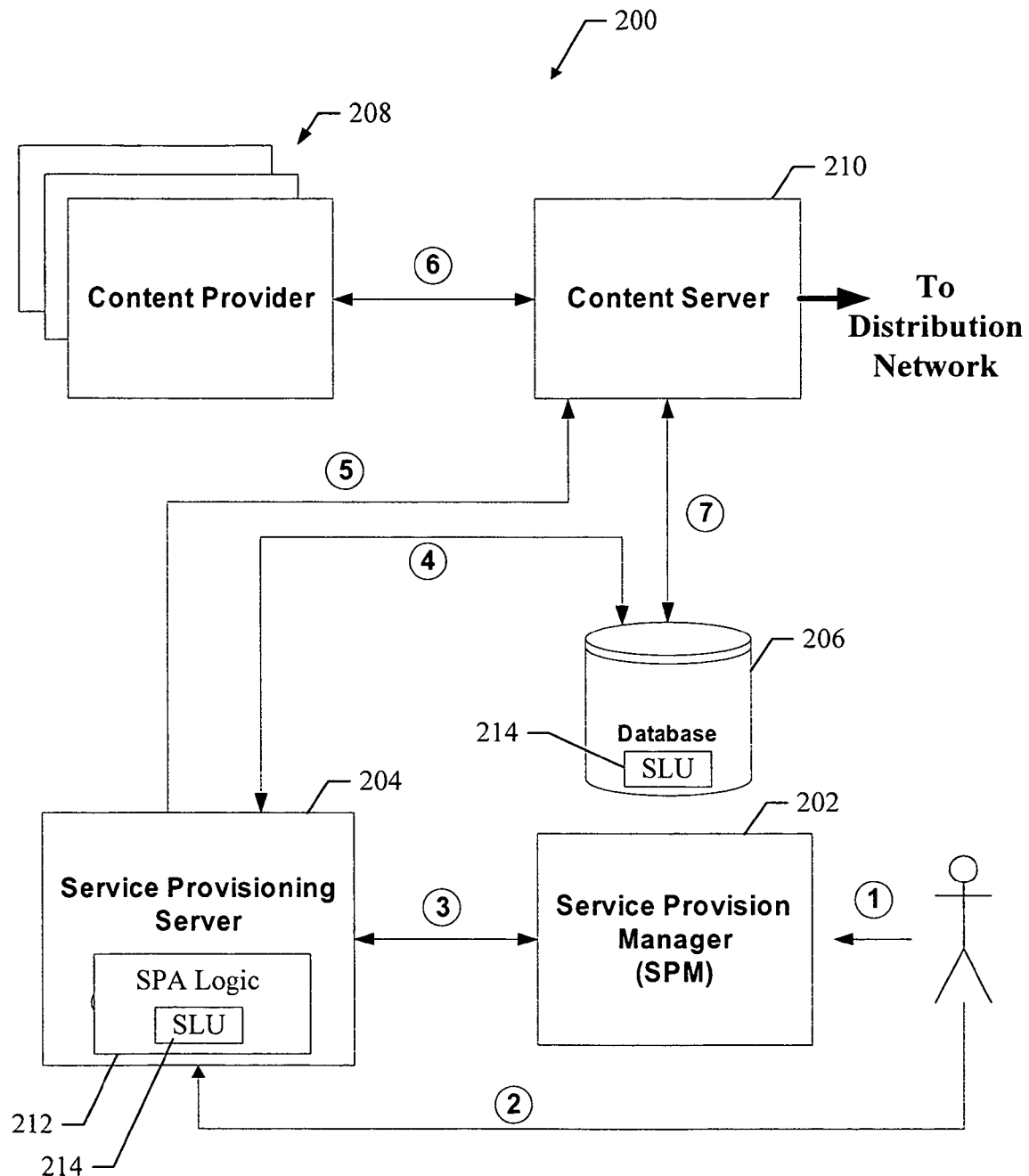
FIG. 2 shows one embodiment of a content delivery system that comprises one embodiment of a SPA system.

FIG. 2 shows one embodiment of a content delivery system 200 that comprises one embodiment of a SPA system. The content delivery system 200 comprises one or more content providers 208, a content server 210, a database 206, a service provisioning server 204 and a service provisioning manager 202. In one embodiment, SPA logic 212 is provided as part of the service provisioning server 204. For example, the SPA logic 212 may be the SPA logic 118 shown in FIG. 1. It should be noted that the SPA logic 212 may be stand alone logic or be part of any other component of the delivery system 200.

In one embodiment, the SPA logic 212 operates to provide planning, scheduling, and analysis for use by other delivery system components so that content may be flexibly and efficiently delivered over a distribution network to authorized devices. For example, in one embodiment, the SPA system operates to enable the following sequence of functions.

1. The SPA logic 212 accepts operator inputs through the service provisioning manager 202 to generate a SLU 214. Using the SPA logic 212, the operator can try various sets of input parameters to determine which one yields the most desirable SLU.
2. Assuming off-line mode, once an acceptable SLU 214 is obtained, the operator performs a service binding process for each service the operator has created in the SLU 214 before the operator publishes the desired SLU 214 to the database 206.
3. 
4. The operator accepts the SLU 214, and the operator can commit the SLU 214 into the database 206 if the SPA system is operated in the network mode.
5. When the SLU 214 is successfully written to the database 206, the provisioning server 204 sends a message to the content server 210 indicating that a new SLU 214 is available.
6. It is assumed that the content providers are informed ahead of time before the new SLU 214 becomes effective. The content server receives a Program Guide from content providers 208 based on the new SLU 214. It is possible for more than one SLU to exist in the database 206. However, only one SLU is active at any given time.
7. The content server 210 verifies the information received from the content providers 208 against the SLU 214 to ensure that presentations are made available to the content server 210 according to the effective SLU.

Notification of a new SLU 214 is used by the content server 210 to determine when it should start pulling content from the content providers 208 to meet the presentation deadline time (the time when the presentation needs to be available on the content server 210 for delivery to devices). In one embodiment, the content server 210 periodically polls content providers 208 for new information such as program guides, presentations, and program records. For example, the content server 210 may receive the presentation program guide several days before it receives the program. On receiving the program guide, the content server 210 operates to verify the information in the program guide against the new SLU 214 and set up an appropriate time to pull content from content providers 208.

If the content server 210 receives a presentation that is larger than the maximum size indicated in the SLU 214, the content server 210 will drop the presentation and raise a system alarm. If the content server 210 receives the presentation from the content providers 208 later than the presentation deadline time as indicated in the SLU 214, the content server 210 will raise a system alarm. Devices that contact the content delivery network when the presentation is not available will automatically re-attempt the retrieval based on any suitable retry schedule.

Thus, the SPA system operates to provide a flexible and efficient system for the planning, scheduling, and delivery of content over a distribution network. It should be noted that the delivery system 200 illustrates just one implementation and that other implementations are possible within the scope of the embodiments.

Figure 3:
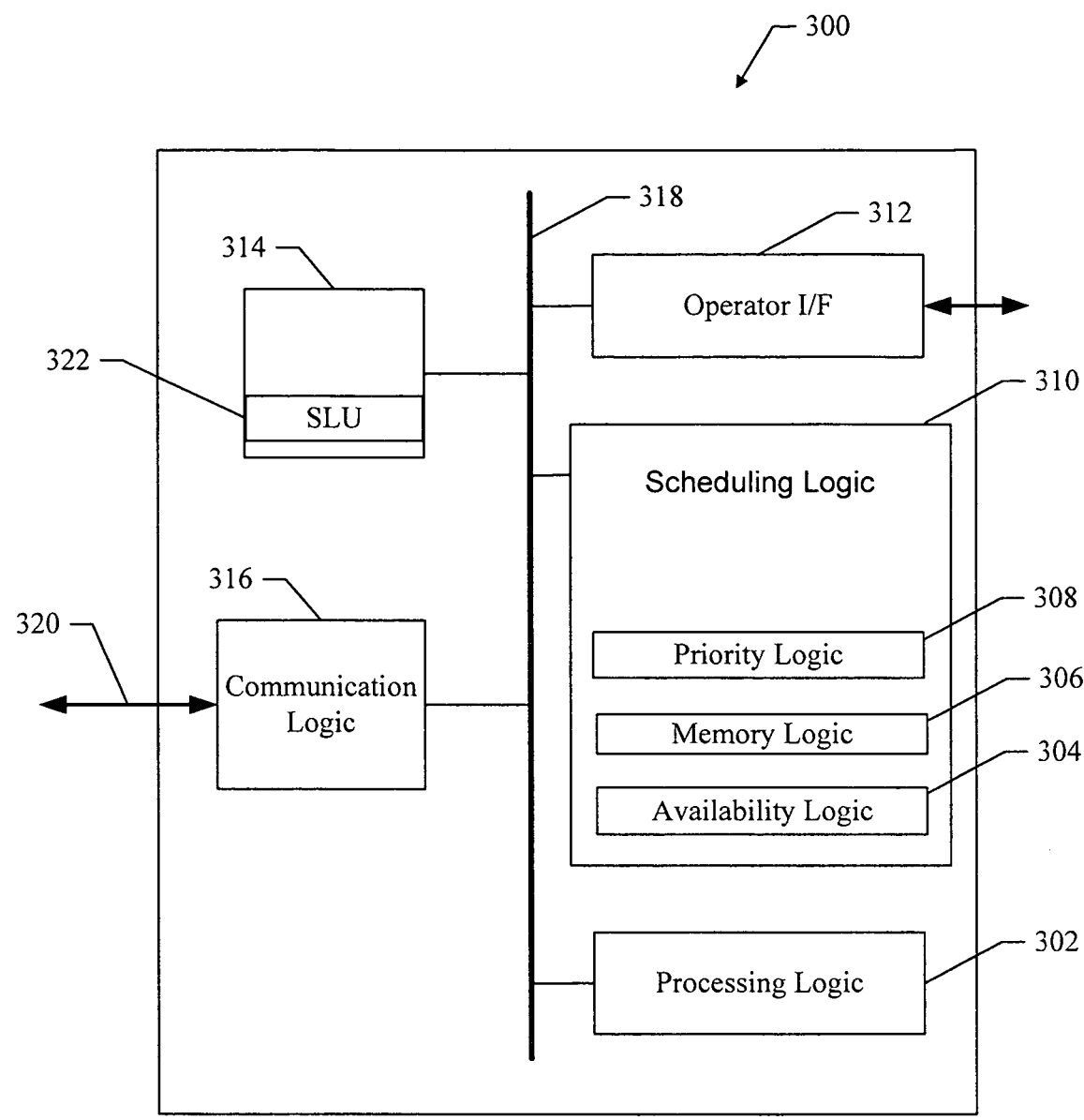
FIG. 3 shows one embodiment of SPA logic for use in embodiments of a SPA system.

FIG. 3 shows one embodiment of SPA logic 300 for use in embodiments of a SPA system. For example, the SPA logic 300 is suitable for use as the SPA logic 118 shown in FIG. 1 or the SPA logic 212 shown in FIG. 2. The SPA logic 300 comprises processing logic 302, scheduling logic 310, operator interface (I/F) logic 312, memory 314, and communication logic 316 all coupled to a data bus 318. In one embodiment, the scheduling logic 310 further comprises availability logic 304, memory logic 306, priority logic 308, In one or more embodiments, the processing logic 302 comprises a CPU, processor, gate array, hardware logic, memory elements, virtual machine, software, and/or any combination of hardware and software. Thus, the processing logic 302 generally comprises logic to execute machine-readable instructions and to control or communicate with one or more other functional elements of the SPA logic 300 via the internal data bus 318.

The communication logic 316 comprises hardware logic and/or software that operate to allow the SPA logic 300 to transmit and receive data and/or other information with remote devices or systems using communication link 320. For example, in one embodiment, the communication link 320 comprises any suitable type of communication link to allow the SPA logic 300 to communicate with other entities of a content delivery system.

The memory 314 comprises any suitable memory device operable to store any type of information. For example, the memory 314 may comprise RAM, Flash memory, EEPROM, hard disk, and/or any other type of storage device. In one embodiment, the memory 314 operates to store one or more versions of a SLU 322 that are generated as part of the operation of the SPA logic 300.

The operator I/F 312 comprises hardware logic and/or software that operate to allow the SPA logic 300 to interact with an operator to receive one or more parameters that are used in embodiments of a SPA system. For example, in one embodiment, the operator I/F 312 is used to receive operator inputs when the SPA logic 300 is operated in a non-network mode (i.e., off-line or stand alone). In the non-network mode, an operator is able to input parameters into the SPA logic 300 to perform what-if scenarios.

The scheduling logic 310 comprises a CPU, processor, gate array, hardware logic, memory elements, virtual machine, software, and/or any combination of hardware and software. In one or more embodiments, the scheduling logic 310 operates to perform a scheduling algorithm to generate the SLU 322. A more detailed description of the scheduling algorithm and the SLU 322 is provided in another section of this document.

The priority logic 308 comprises a CPU, processor, gate array, hardware logic, memory elements, virtual machine, software, and/or any combination of hardware and software. In one or more embodiments, the priority logic 308 operates to determine content priority to allow the scheduling logic 310 to schedule content presentations in a selected order. A more detailed description of the operation of the priority logic 308 is provided in another section of this document.

The memory logic 306 comprises a CPU, processor, gate array, hardware logic, memory elements, virtual machine, software, and/or any combination of hardware and software. In one or more embodiments, the memory logic 306 operates to determine memory requirements for devices attempting to receive content described in a SLU. A more detailed description of the operation of the memory logic 306 is provided in another section of this document.

The availability logic 304 comprises a CPU, processor, gate array, hardware logic, memory elements, virtual machine, software, and/or any combination of hardware and software. In one or more embodiments, the availability logic 304 operates to determine an availability duration that indicates how long content is available for devices to receive. A more detailed description of the operation of the availability logic 304 is provided in another section of this document.

During operation, the SPA logic 300 operates to perform one or more of the following functions.

1. Receive operator input through the operator I/F 312. The operator input may select an operating mode for the SPA logic 300 or may provide Global, Service-specific, or other parameters.
2. Determine content priority for content to be delivered.
3. Generate contact windows for content delivery.
4. Perform a scheduling algorithm to generate a SLU for content presentations based on the content priority.
5. Determine memory requirements based on the SLU.
6. Determine an availability duration for the presentations.

In one embodiment, the SPA system comprises a computer program having one or more program instructions ("program instructions") stored on a computer-readable medium, which when executed by at least one processor, for instance, the processing logic 302, provides the functions described herein. For example, the program instructions may be loaded into the SPA logic 300 from a computer-readable medium, such as a floppy disk, CDROM, memory card, FLASH memory device, RAM, ROM, or any other type of memory device or computer-readable storage medium that interfaces to the SPA logic 300. In another embodiment, the program instructions may be downloaded into the SPA logic 300 from an external device or network resource. The program instructions, when executed by the processing logic 302, provide embodiments of a SPA system as described herein.

Thus, the SPA logic 300 operates to provide a flexible and efficient system for the planning, scheduling, and delivery of content over a distribution network. It should be noted that the SPA logic 300 illustrates just one implementation and that other implementations are possible within the scope of the embodiments.

Sector Throughput

Figure 4:
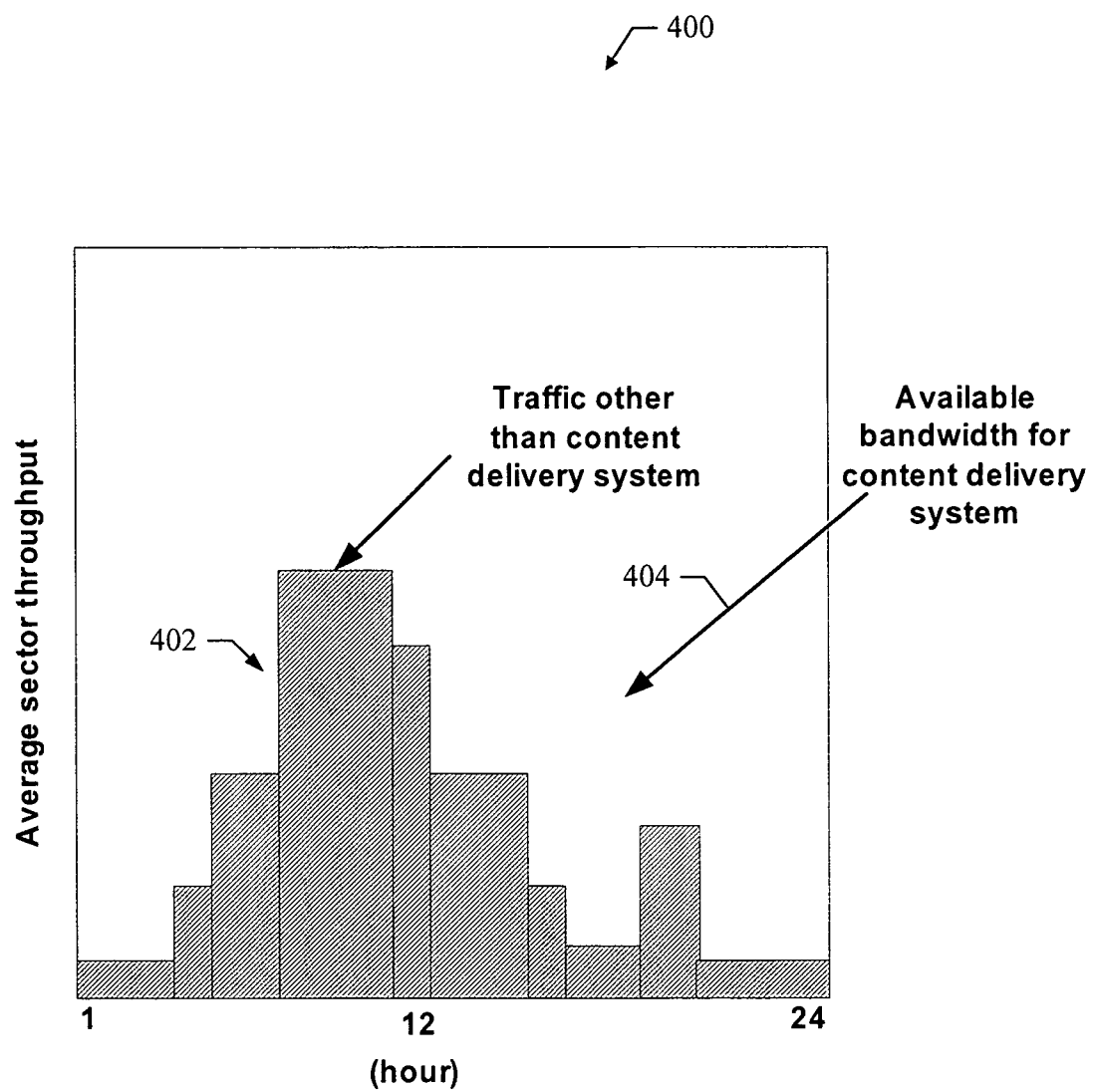
FIG. 4 shows a graph that illustrates sector throughput for use in embodiments of a SPA system.

FIG. 4 shows a graph 400 that illustrates sector throughput for use in embodiments of a SPA system. The graph 400 illustrates the average sector throughput in each portion of a 24-hour period as a two-dimensional bin. The height of a bin represents the average sector throughput, and the width of a bin represents a selected portion of the 24-hour period. Traffic during the 24-hour period that is "non-content delivery system" traffic is shown generally as the shaded region 402. This is traffic that occurs as the result of other network systems or functions. The amount of bandwidth available for the content delivery system to deliver content is shown at 404. This area represents the bin area not occupied by the non-content delivery system traffic 402.

SPA Scheduling Algorithm

In one embodiment, the scheduling logic 310 operates to provide a scheduling algorithm to schedule (i.e., pack) as many presentations (objects) within the available sector bandwidth. In one embodiment, the scheduling algorithm derives one or more contact windows based on assumptions of the average sector throughput and the average use of a sector's capacity by non-content delivery system traffic. For example, in a wireless network environment, forward link sector throughput varies as a function of channel conditions and the type of traffic sent on the forward link. Generally, the maximum forward link sector throughput occurs when all sector users are FTP users, and when they have infinite files to download. This particular traffic model yields a higher sector throughput because all users are receiving only data, compared to the traffic model with a mix of FTP, WAP, and HTTP users. Since it may not be possible to predict the traffic mix during program download, the algorithm assumes an average value for sector throughput. This average value is assumed to be constant for the 24-hour period of scheduling, and is the same for all sectors serving the content delivery system. However, it should be noted that embodiments of the algorithm may be adjusted to utilize multiple sector throughput values over the 24-hour period and/or provide different throughput values for different sectors serving the content delivery system.

Since the content delivery system may not be the only data service using sector capacity, the scheduling algorithm operates to consider other non-content delivery system traffic that is competing for the forward link resource. In one embodiment, an operator inputs the percentage of non-content delivery system traffic utilizing sector capacity per hour. In one embodiment, the algorithm assumes that these values are the same for all the sectors serving the content delivery system. In practice, non-content delivery system traffic use may vary from sector to sector, since the mix of traffic type and the traffic loading of non-content delivery system users are not the same. However, embodiments of the scheduling algorithm may operate without making use of sector specific information since this information is dynamically changing. Thus, in a preferred embodiment, the algorithm assumes that the average sector throughput and the average non-content delivery system traffic use is representative for the entire network serving the content delivery system.

In one embodiment, the algorithm also assumes a uniform distribution of content delivery system subscribers throughout all of the sectors serving the content delivery system. Generally, it is expected that there will be sectors with higher concentrations of content delivery system subscribers than other sectors, and that the number of subscribers per sector will vary dynamically throughout the day. However, in a preferred embodiment, the scheduling algorithm operates to provide only one content delivery schedule for the entire network. It should be noted however that in other embodiments, the algorithm may utilize sector specific information.

Algorithm Notations

In one or more embodiments, the SPA system provides a content delivery scheduling algorithm that utilizes one or more of the following parameters.

C: the average sector throughput per hour $N_s$: the total number of services j: service j, for $j \in N_s$ $N_p^j$: the total number of presentations need to be scheduled for a one week period for Service j, for $j \in N_s$ $p_i^j$: presentation i belonging to service j, for $i \in N_p^j$, $j \in N_s$ $k_i^j$: the maximum size of presentation i belonging to service j, for $i \in N_p^j$, $j \in N_s$ $s_i^j$: the start time of the contact window for presentation $p_i^j$, for $i \in N_p^j$, $j \in N_s$ $e_i^j$: the end time of the contact window for presentation $p_i^j$, for $e_i^j > s_i^j$ and $i \in N_p^j \in N_s$ $W_i^j = [s_i^j, e_i^j]$: the contact window for presentation $p_i^j$, for $i \in N_p^j$, $j \in N_s$ $v_i^j$: the viewing time of presentation $p_i^j$. This is the time advertised in the PG that the presentation is available for user viewing, for $i \in N_p^j$, $j \in N_s$ $d_i^j$: the deadline for presentation $p_i^j$, for $i \in N_p^j$, $j \in N_s$. This is the time that the presentation needs to be available on the content server for delivering to devices $T_i^j = [d_i^j, v_i^j]$: the delivery window. This defines the total time available for scheduling the delivery of presentation $p_i^j$, for $i \in N_p^j$, $j \in N_s$ $G_i^j$: the total amount of forward air link resource needed to deliver presentation $p_i^j$, for $i \in N_p^j$, $j \in N_s$ $n^j$: the total number of subscribers for service j for $j \in N_s$ z: the number of sectors serving the content delivery system service b(k): the percentage of non-content delivery system traffic for hour k, for $k \in \{1, 2, \ldots, 24\}$ Note that $T_i^j$ denotes the total time available for scheduling the delivery of presentation $p_i^j$. Depending on the operation of the scheduling algorithm and the amount of non-content delivery system traffic utilization during the interval $T_i^j$, the following cases may occur.

1. The contact window $W_i^j$ for program is $p_i^j$ smaller than or equal to the delivery window ($W_i^j \leq T_i^j$).

2. There exists no contact window in which the program $p_i^j$ can be scheduled, i.e., $W_i^j = 0$.

Figure 5:
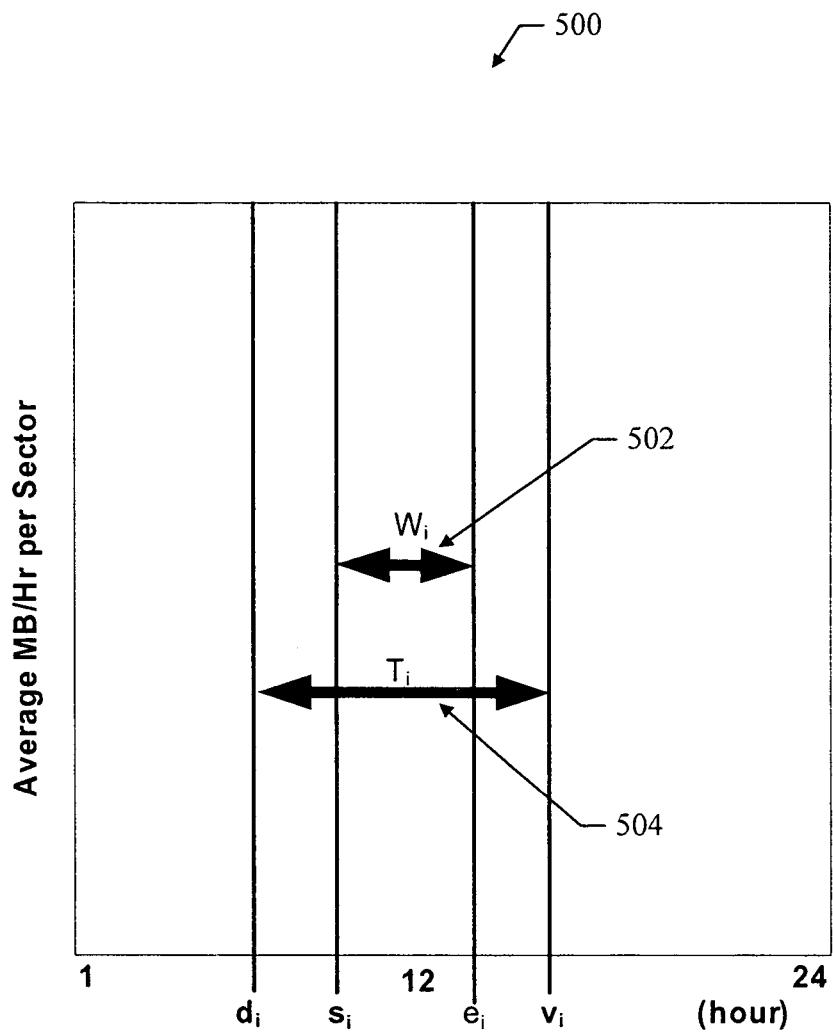
FIG. 5 illustrates the relationship between a contact window and a delivery window for use in embodiments of a SPA system.

FIG. 5 illustrates the relationship between a contact window 502 and a delivery window 504 for use in embodiments of a SPA system. Case 1 above describes a scenario where the algorithm can successfully schedule the Presentation. Note that the contact window 502 can be smaller than the delivery window 504, as shown in FIG. 5.

Case 2 above describes a scenario where the algorithm cannot schedule the presentation within the specified delivery window $T_i^j$ because other presentations are already scheduled in the same time interval, or there is a large volume of non-content delivery system traffic within the delivery window. For example, in FIG. 5, $T_i$ is the delivery window 504, where $v_i$ is equal to or greater than $d_i$, and $W_i$ is the contact window 502, where $e_i$ is equal to or greater than $s_i$. The delivery window 504 will normally exceed the contact window 502 in size to allow flexibility in delivering a presentation.

The total forward air link resource per sector required to deliver presentation $p_i^j$, is $G_i^j$, which is derived as follows.

$$G_i^j = k_i^j \cdot \left\lceil \frac{n^j}{z} \right\rceil + \theta_i^j,$$

for presentation $p_i^j$ and $i \in N_p$, $j \in N_s$

The first term in the equation denotes the total forward air link resource (bytes) per sector needed to deliver presentation $p_i^j$ to all subscribers once. The second term $\theta_i^j$ denotes the additional forward air link resource per sector to retransmit presentation $p_i^j$ to a subset of devices that did not receive the content in the first transmission. It will be assumed that the value $\theta_i^j$ is zero.

In one embodiment, the scheduling algorithm can schedule $N_i^j$, $\forall j \in N_s$, if the following property holds:

$$\sum_{j=1}^{N_s} \sum_{i=1}^{N_p^j} G_i^j \leq 168 \cdot C - \sum_{k=1}^{168} b(k)$$

The above equation expresses that all presentations can be scheduled if the total sum of the content delivery system traffic is less than or equal to the total amount of un-utilized sector bandwidth for the selected scheduling period. It should be noted that due to constraints associated with when the presentations should be delivered (delivery deadline), not all presentations can be scheduled even though the above property holds true.

Priority Ranking of Presentations

In one embodiment, the algorithm schedules presentations in the order of presentation priority. For example, the priority logic 308 operates to determine presentation priorities that are used by the scheduling algorithm to schedule presentations. A presentation with a higher priority ranking is scheduled before a presentation with lower priority ranking. In one embodiment, the priority logic 308 operates to prioritized presentations in the order of a service ranking. For example, if a service contains more than one presentation, the presentation with the earliest presentation viewing time is assigned the higher priority. It should be noted that the scheduling algorithm may operate to rank presentations based on any characteristic or condition and assign priorities accordingly thereby affecting the scheduling order.

Figure 6:
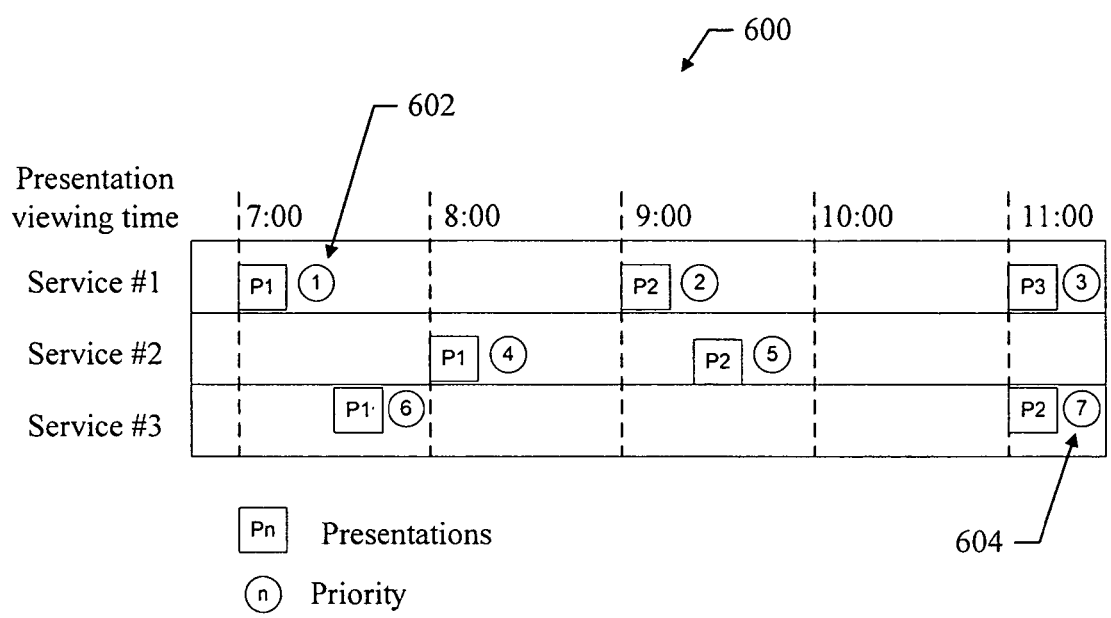
FIG. 6 shows a time table that illustrates how priorities are assigned to presentations in embodiments of a SPA system.

FIG. 6 shows a time table 600 that illustrates how priorities are assigned to presentations in embodiments of a SPA system. For example, priorities shown in the time table 600 are generated by the priority logic 308. The timetable 600 shows the presentation times for three services, namely: Service #1, Service #2, and Service #3. In this example, the services are ranked according to a service ranking order. The Service #1 has the highest ranking, then Service #2, and then Service #3. Service #1 has three presentations with viewing times of 7:00, 9:00, and 11:00. The first presentation of Service #1 is assigned a presentation priority of one (1) (as shown at 602) because it belongs to the service with the highest service ranking and has the earliest viewing time. The second presentation of Service #3 has the lowest priority (as shown at 604) because it belongs to the service with the lowest service ranking and has the last viewing time. The remaining presentations are prioritized in a similar fashion. However, it should also be noted that the time table 600 illustrates just one technique for setting priorities and that the SPA system may operate to assign priorities using any other suitable technique or criteria.

Example of Algorithm Operation

The following is an example of the operation of one embodiment of a scheduling algorithm provided by one embodiment of a SPA system. For example, the scheduling logic 310 operates to provide the scheduling algorithm whose operation is described below. In one or more embodiments, the scheduling algorithm is configured to generate a content delivery schedule to achieve one or more of the following objectives.

1. Generate a contact window as close to the viewing time as possible. The algorithm starts from the viewing time and allocates resource until it reaches the presentation deadline time. This allows the most recent content to be delivered as close as possible to the viewing time.
2. Generate the schedule to keep the contact window contiguous and uniform in time. Since any subscribed device can "pull" content at any time while the contact window is open, content should be distributed evenly across the delivery window to allow the system to meet the demand of any device.
3. Generate the schedule to keep the contact window as wide as possible. The wider the contact window, the more evenly content can be distributed. This will in turn result in more even loading of the network resources. By avoiding load spikes, loading on the network is evenly distributed, providing a higher chance for successful delivery.

In this example, the scheduling algorithm is configured to run at a time granularity of one half hour and in a scheduling unit of one megabyte (Mbyte) per allocation cycle. However, it should be noted that the scheduling algorithm can be configured to run at different time granularity and memory unit sizes. Since the time granularity is set at one half hour, the viewing time of a presentation is rounded down to one half hour in scheduling. In one embodiment, the presentations are first ranked based on selected criteria. For example, the priority logic 308 operates to rank the presentations as described above. The scheduling algorithm then operates as described in the following method.

Figure 7:
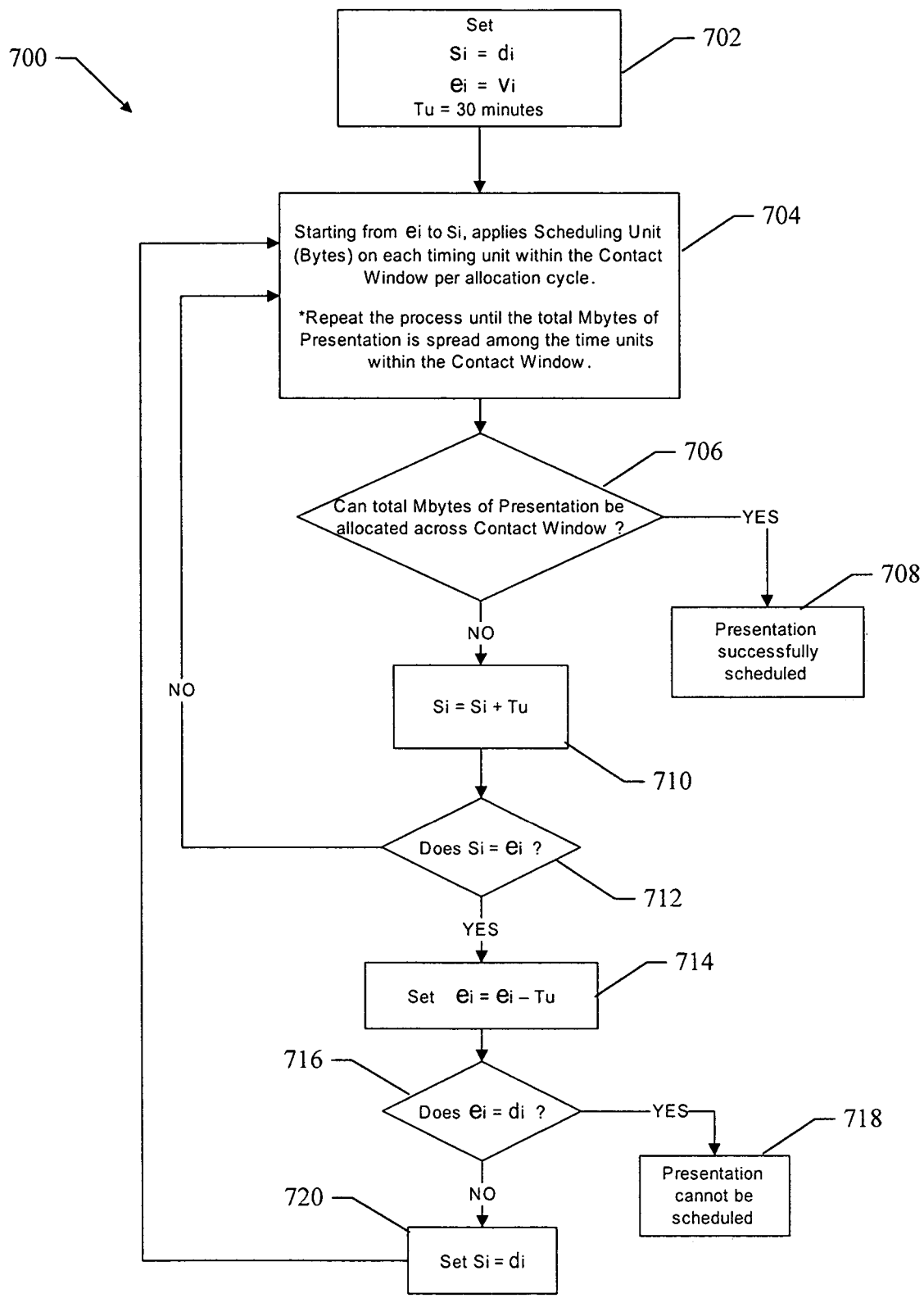
FIG. 7 shows one embodiment of a method for providing a scheduling algorithm for use in embodiments of a SPA system.

FIG. 7 shows one embodiment of a method 700 for providing a scheduling algorithm for use in embodiments of a SPA system. For example, in one embodiment, the method 700 is provided by operation of the scheduling logic 310 and is described below with reference to the scheduling logic 310. The method 700 assumes the following parameters.

Contact window start time: Si
Contact window end time: ei
Program fetch deadline: di
Program viewing time: vi
Delivery window: Ti=vi−di
Granularity Unit: Tu The method begins at block 702 where selected parameters are initialized. For example, the contact window start time is set to the program fetch deadline, and the contact window end time is set to the program viewing time. Furthermore, the granularity time is set to thirty minutes.

At block 704, one or more allocation cycles are performed until the total size of the presentation is spread among the time units within the contact window. In one embodiment, an allocation cycle starts from the contact window end time and proceeds to the contact window start time. The algorithm applies scheduling units (bytes) to each time unit within the contact window per allocation cycle. The process is repeated until the total size of the presentation is spread among the time units within the contact window.

At block 706, a test is performed to determine if the total size of the presentation can be allocated across the contact window. If the presentation can be allocated, the presentation is successfully scheduled and the method ends at block 708. If the presentation cannot be allocated across the contact window, the method proceeds to block 710.

At block 710, the contact window start time is increased by the granularity unit. For example, the contact window start time is increased by thirty minutes.

At block 712, a test is performed to determine if the contact window start time is equal to the contact window end time. If the contact window start time is not equal to the contact window end time, the method proceeds back to block 704 to attempt the scheduling process again. If the contact window start time is equal to the contact window end time, the method proceeds to block 714.

At block 714, the contact window end time is reduced by the granularity time. For example, the contact window end time is reduced by thirty minutes.

At block 716, a test is performed to determine if the contact window end time is equal to the program fetch deadline. If the contact window end time is equal to the program fetch deadline, then the presentation cannot be scheduled and the method proceeds to block 718. If the contact window end time is not equal to the program fetch deadline, then the method proceeds to block 720.

At block 720, the contact window start time is set to the program fetch deadline. The method then proceeds to block 704 to attempt the scheduling process again.

Thus, the method 700 operates to provide one embodiment of a scheduling algorithm for use in embodiments of a SPA system. It should be noted that the method 700 is just one implementation and that other implementations are possible within the scope of the embodiments. For example, any of the functions of the method 700 may be added to, changed, deleted, modified, combined, or otherwise adjusted within the scope of the embodiments.

Figure 8:
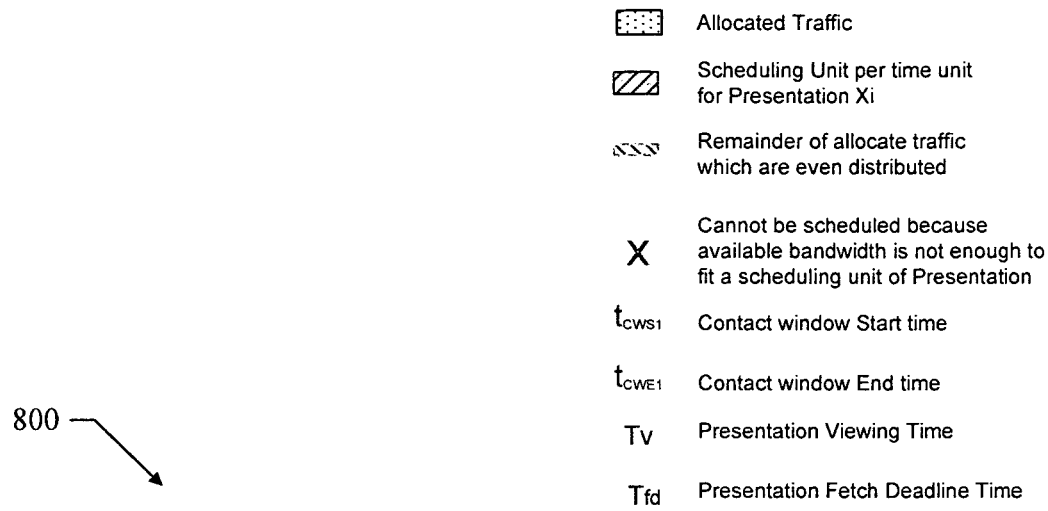
FIGS. 8-10 show graphs that illustrate three scheduling cases, respectively, that may occur during the operation of the method shown in FIG. 7.
Figure 8:
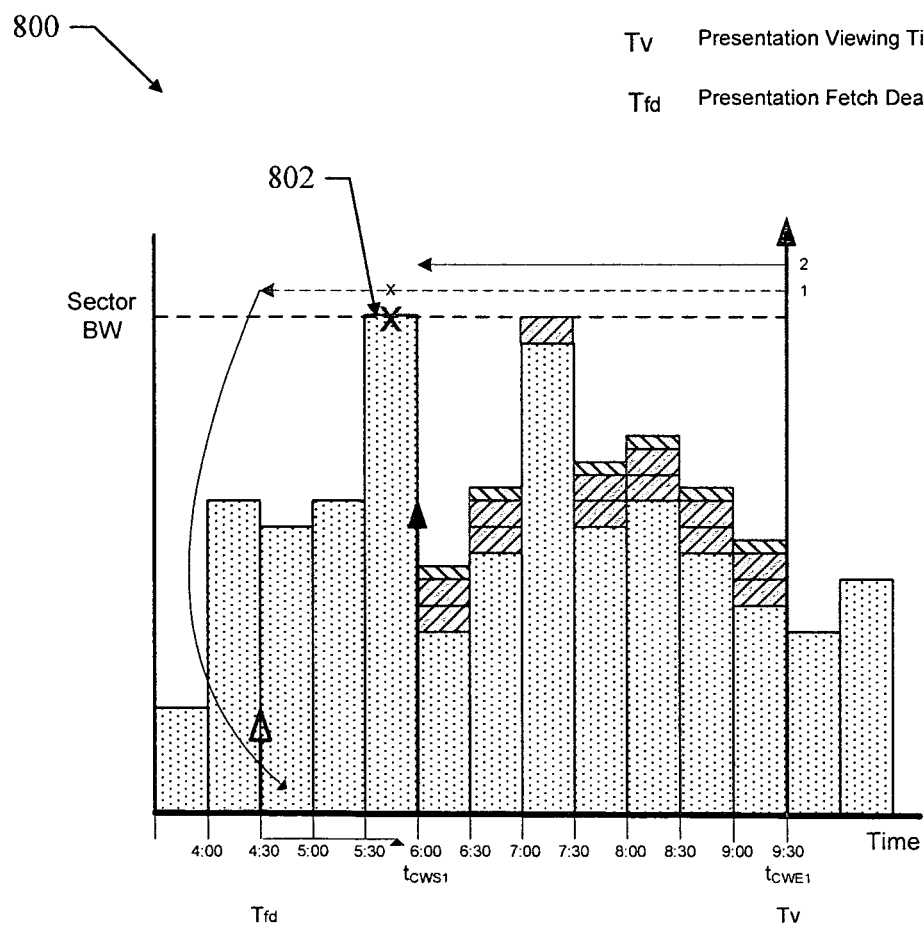
Figure 9:
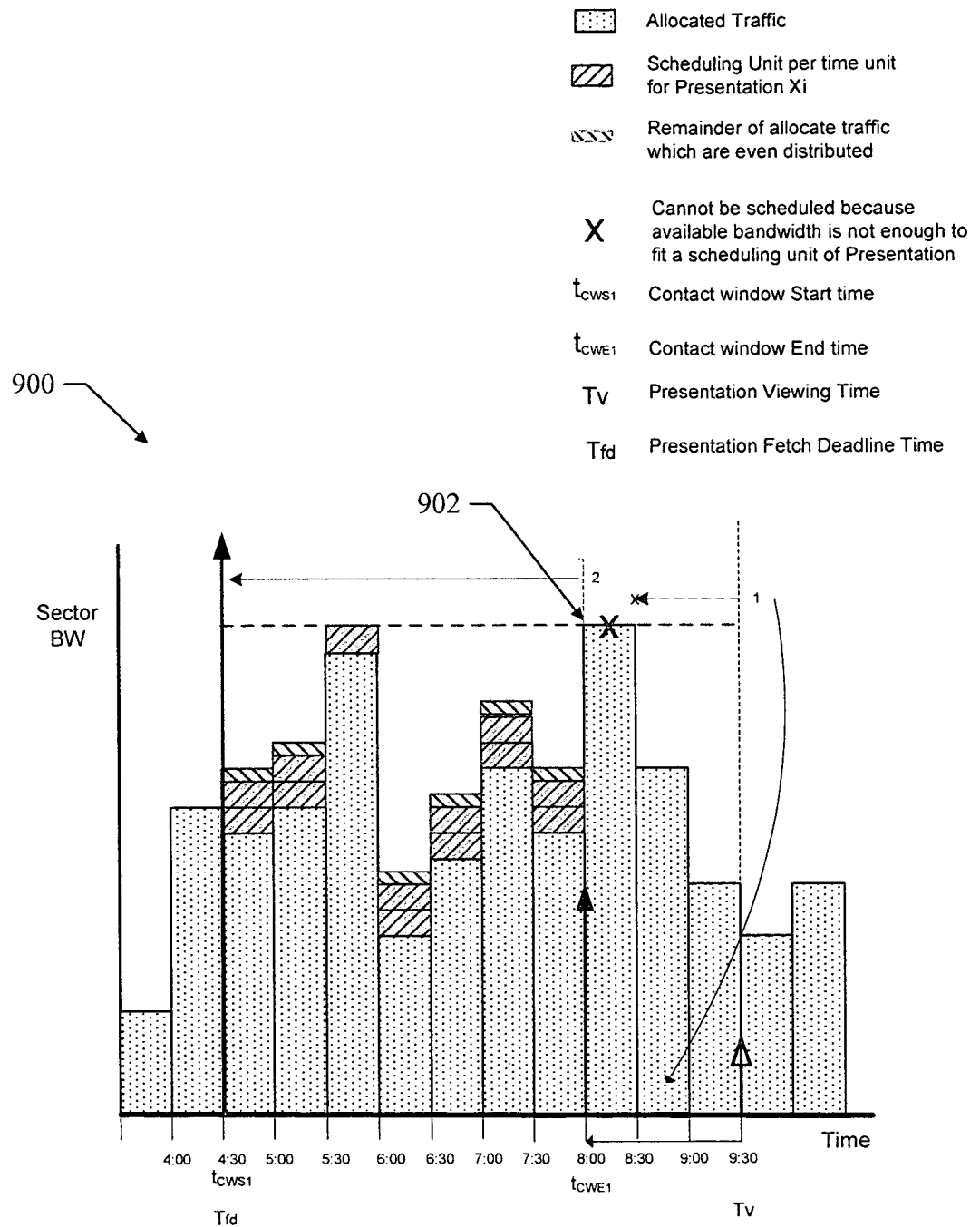
Figure 10:
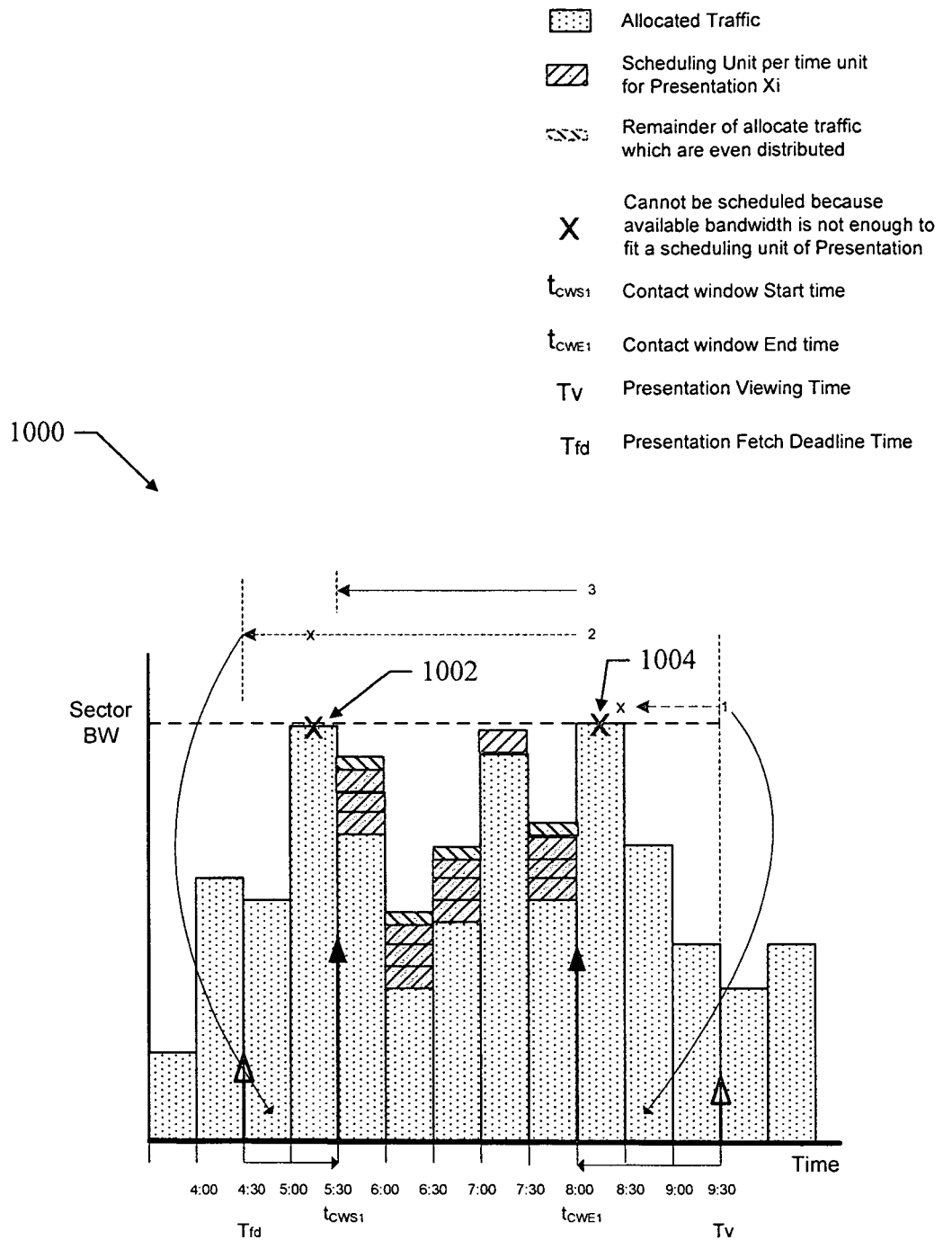

FIGS. 8-10 show graphs that illustrate three scheduling cases, respectively, that may occur during the operation of the method 700. All cases illustrate that the scheduling algorithm provided by the method 700 is applying the scheduling unit (bytes) on each time unit across the contact window per allocation cycle starting from contact window end time to the contact window start time. This process repeats until the total media minutes are allocated completely and successfully. On the last allocation cycle, the remainder of the media minutes is evenly distributed among the time units which have more resources to allocate to the content.

FIG. 8 illustrates a first case where the scheduling algorithm provided by the method 700 cannot allocate the content at the time unit from 5:30 to 6:00 on the first allocation cycle, as shown at 802. The scheduling algorithm provided by the method 700 then shifts the contact window start time to 6:00 and repeats the scheduling function. This process is repeated until either the total media minutes are allocated over the new contact window or the total media minutes can not be scheduled.

FIG. 9 illustrates a second case where the scheduling algorithm provided by the method 700 is successful after the contact window end time has shifted to from 9:30 to 8:00. For example, the content window end time was shifted when the content could not be allocated at the time unit from 8:00 to 8:30, as shown at 902.

FIG. 10 illustrates a third case where the scheduling algorithm provided by the method 700 is successful after both the contact window start and end times are changed accordingly to allow the total media minutes to be allocated across the new contact window. For example, the content could not be allocated at the time unit from 5:00 to 5:30, as shown at 1002 so the contact window start time is shifted to 5:30. Furthermore, the content could not be allocated at the time unit from 8:00 to 8:30, as shown at 1004 so the contact window end time is shifted to 8:00.

Uniformity Factor

The scheduling algorithm provided by the method 700 does not take into consideration a uniformity factor. Each device is given a contact window that indicates the time interval in which the device can contact the network to receive content. The device picks a random time uniformly distributed between the contact window start time and the contact window end time in which to contact the network. Hence, the network resource allocation is uniformly distributed within the contact window. In the first pass of the algorithm provided by the method 700, the algorithm tries to allocate network resources within the delivery window. Once that is successful, it will take the second pass to allocate resources uniformly across the resulting contact window.

In one embodiment, the contact window is selected to be non-uniform. The server then operates to convey the non-uniform nature of the window to devices. Thus, the device operates to weight the non-uniformity of the contact window when connecting to the server. In one embodiment, a non-uniform contact window is more bandwidth efficient because more presentations can be scheduled for delivery.

Figure 11:
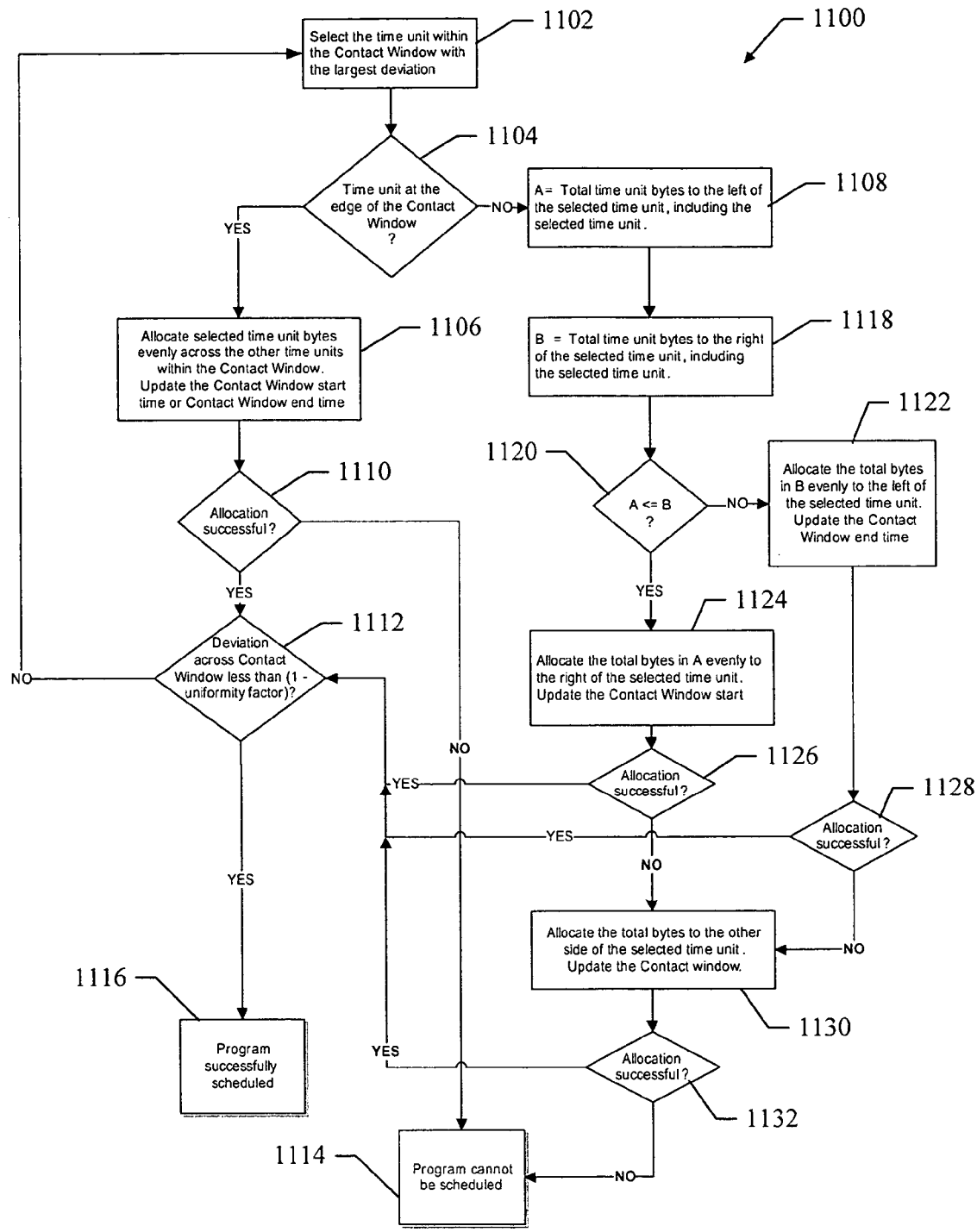
FIG. 11 shows one embodiment of a method for providing a scheduling algorithm that utilizes a uniformity factor to schedule content for use in embodiments of a SPA system.

FIG. 11 shows one embodiment of a method 1100 for providing a scheduling algorithm that utilizes a uniformity factor to schedule content for use in embodiments of a SPA system. For example, the method 1100 shows how uniformity can be achieved with an assumed uniformity factor of 0.8. In one embodiment, the scheduling logic 310 operates to provide the functions of the method 1100 described below.

At block 1102, a time unit is selected within the contact window with the largest deviation. At block 1104, a test is performed to determine if the selected time unit is at the edge of the contact window. If the time unit is at the edge of the contact window, the method proceeds to block 1106. If the time unit is not at the edge of the contact window, the method proceeds to block 1108.

At block 1106, the bytes associated with the selected time unit are allocated evenly across the other time units within the contact window. The contact window start or end time is also updated accordingly.

At block 1110, a test is performed to determine if the allocation was successful. If the allocation was successful, the method proceeds to block 1112. If the allocation was not successful, the method ends at block 1114 because the program cannot be scheduled.

At block 1112, a test is performed to determine if the deviation across the contact window is less than (1−uniformity factor). For example, the uniformity factor is assumed to be 0.8. If the deviation across the contact window is not less than (1−uniformity factor), the method proceeds to back to block 1102. If the deviation across the contact window is less than (1−uniformity factor), the program has been successfully scheduled and the method ends at block 1116.

At block 1108, a value for a parameter (A) is set to equal the total time unit bytes to the left of and including the selected time unit. At block 1118, a value of a parameter (B) is set equal to the total time unit bytes to the right of and including the selected time unit.

At block 1120, a test is performed to determine if the parameter A is less than or equal to the parameter B. If the parameter A is less than or equal to the parameter B, the method proceeds to block 1124. If the parameter A is not less than and not equal to the parameter B, the method proceeds to block 1122.

At block 1124, the total bytes in A are allocated evenly to the right of the selected time unit and the contact window start time is updated accordingly. At block 1126, a test is performed to determine is the allocation was successful. If the allocation was successful, the method proceeds to block 1112. If the allocation was not successful, the method proceeds to block 1130.

At block 1130, the total bytes are allocated to the other side of the selected time unit and the contact window is updated accordingly. At block 1132, a test is performed to determine is the allocation was successful. If the allocation was successful, the method proceeds to block 1112. If the allocation was not successful, the program cannot be scheduled and the method ends at block 1114.

At block 1122, the total bytes in B are allocated evenly to the left of the selected time unit and the contact window end time is updated accordingly. At block 1128, a test is performed to determine is the allocation was successful. If the allocation was successful, the method proceeds to block 1112. If the allocation was not successful, the method proceeds to block 1130.

Thus, the method 1100 operates to provide one embodiment of a scheduling algorithm that utilizes a selected uniformity factor for use in embodiments of a SPA system. It should be noted that the method 1100 is just one implementation and that other implementations are possible within the scope of the embodiments. For example, any of the functions of the method 1100 may be added to, changed, deleted, modified, combined, or otherwise adjusted within the scope of the embodiments.

Figure 12:
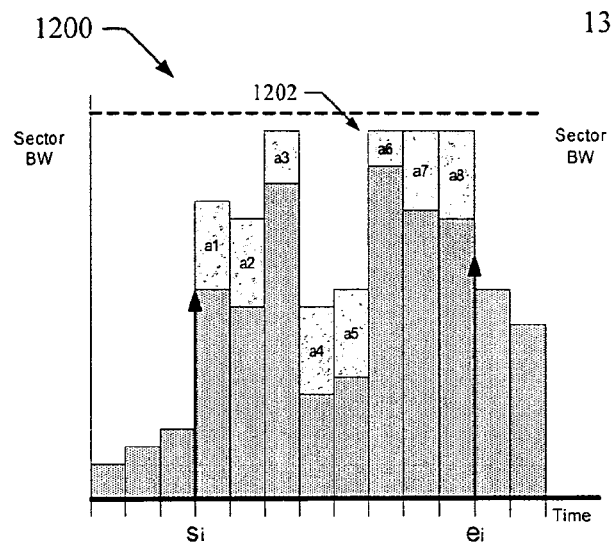
FIGS. 12-14 show graphs that illustrate the operation of the method shown in FIG. 11.
Figure 13:
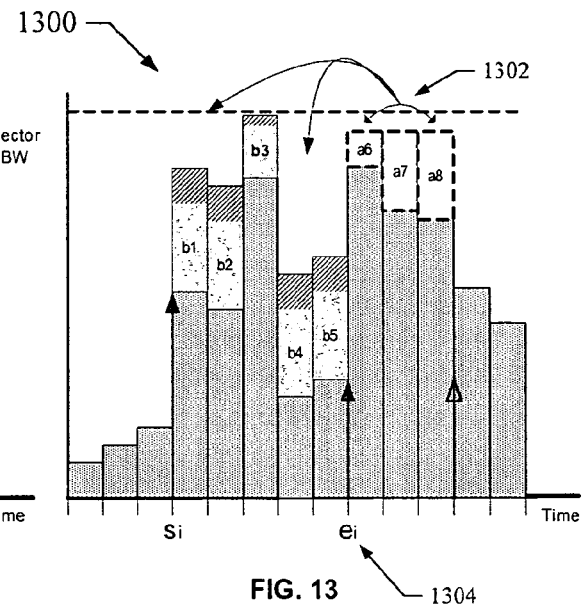
Figure 14:
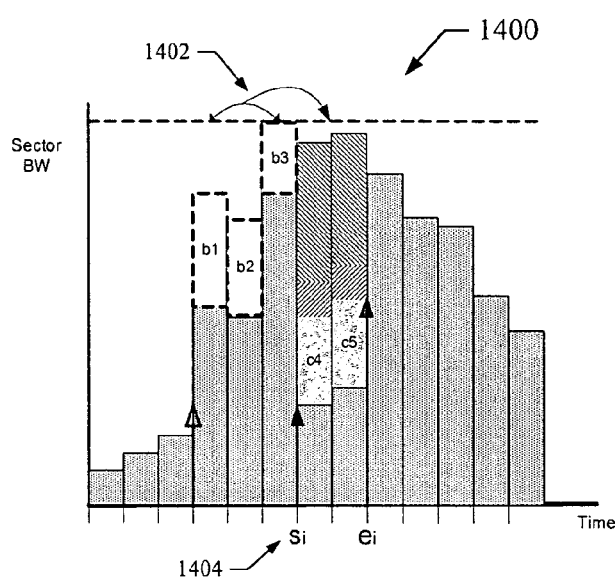

FIGS. 12-14 show graphs that illustrate the operation of the method 1100 shown in FIG. 11.

FIG. 12 shows a graph that illustrates the operation of the method 1100 when the deviation across the contact window is greater than (1−uniformity factor). As a result, unit "a6" is the selected time unit (as shown at 1202) and determined during the operation of block 1102 of the method 1100.

After selecting the time unit "a6", values for the parameters A and B are calculated, which corresponds to the operation of blocks 1108 and 1118, respectively, of the method 1100. Thus, the values for A and B can be expressed as follows.

$$A = a1 + a2 + a3 + a4 + a5 + a6$$

$$B = a6 + a7 + a8$$

It will be assumed that A>B so that all time units in B are to be evenly allocated to the left of unit a6, which corresponds to the operation of block 1122 of the method 1100.

FIG. 13 shows a graph that illustrates how all the time units in B are evenly allocated to the left of unit a6. For example, the time units a6, a7, and a8 are allocated to the left of a6 into blocks b1, b2, b3, b4, and b5, as shown at 1302. Furthermore, the end time of the contact window is updated as shown at 1304.

After this successful allocation, the deviation across the contact window is still greater than (1−uniformity factor). This determination corresponds to the test performed at block 1112 of the method 1100. Next, the unit "b3" is selected when the function at block 1102 of the method 1100 is performed.

After selecting the unit "b3", values for the parameters A and B are calculated, which corresponds to the operation of blocks 1108 and 1118, respectively, of the method 1100. Thus, the values for A and B can be expressed as follows.

$$A = b1 + b2 + b3$$

$$B = b3 + b4 + b5$$

It will be assumed that A<=B so that all time units in A are to be evenly allocated to the right of unit b3, which corresponds to the operation of block 1124 of the method 1100.

FIG. 14 shows a graph that illustrates how all time units in A are evenly allocated to the right of unit b3, which corresponds to the operation of block 1124 of the method 1100. For example, the time units b1, b2, and b3 are allocated to the right of b3 into blocks c4 and c5, as shown at 1402. Furthermore, the start time of the contact window is updated as shown at 1404.

After this successful allocation, the deviation across the contact window is less than (1−uniformity factor). Thus, the presentation is successfully scheduled, which corresponds to block 1116 of the method 1100.

Derivation of Subscribed Memory and Availability Duration

In one embodiment, the memory logic 306 operates to determine the subscribed memory required per service. Subscribed memory per service is the total amount of memory that needs to be available on a device before the device user can subscribe to a service. The number of presentations that can be stored on a device per service is depended on a buffering flag. For example, the buffering flag may have values ranging from 1 to N. In one embodiment, the buffering flag determines how many presentations can be stored at a device at any given time and therefore indicates the amount of memory a device must have available for a selected scheduling period.

In one embodiment, the availability logic 304 operates to determine an availability duration which describes a time duration over which a presentation is available for viewing. In one embodiment, the availability duration is based on the buffering flag.

Figure 15:
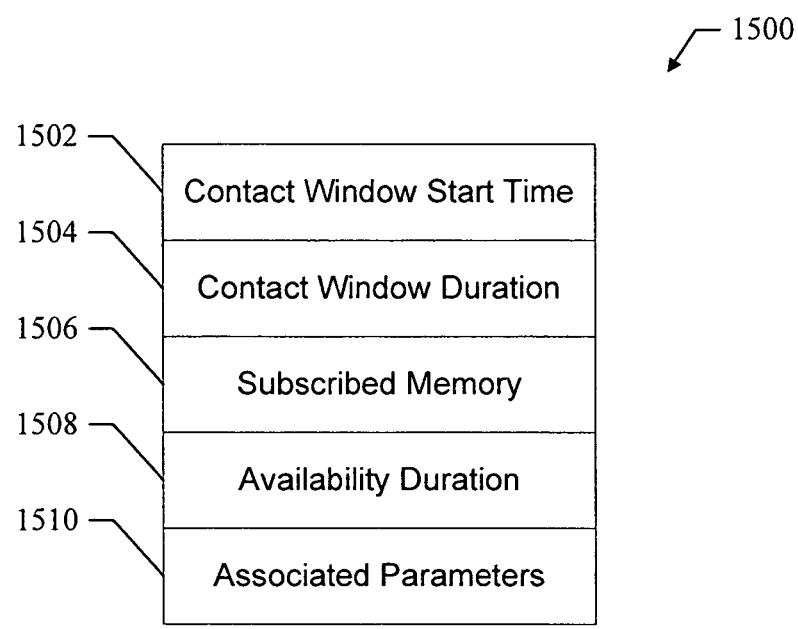
FIG. 15 shows one embodiment of a SLU for use in embodiments of a SPA system.

FIG. 15 shows one embodiment of a SLU 1500 for use in embodiments of a SPA system. For example, the SLU 1500 may be the SLU 322 shown in FIG. 3. In one embodiment, the SLU 1500 is generated by the scheduling logic 310.

The SLU 1500 comprises one or more instances of a parameter sequence for each presentation. In one embodiment, the parameter sequence comprises a contact window start time 1502, a contact window duration time 1504, a subscribed memory size 1506, an availability duration time 1508, and associated parameters 1510. For example, the associated parameters 1510 may comprise parameters input by an operator to initialize the scheduling algorithm. It should be noted that the SLU 1500 represents just one implementation and that other implementations are possible within the scope of the embodiments.

Figure 16:
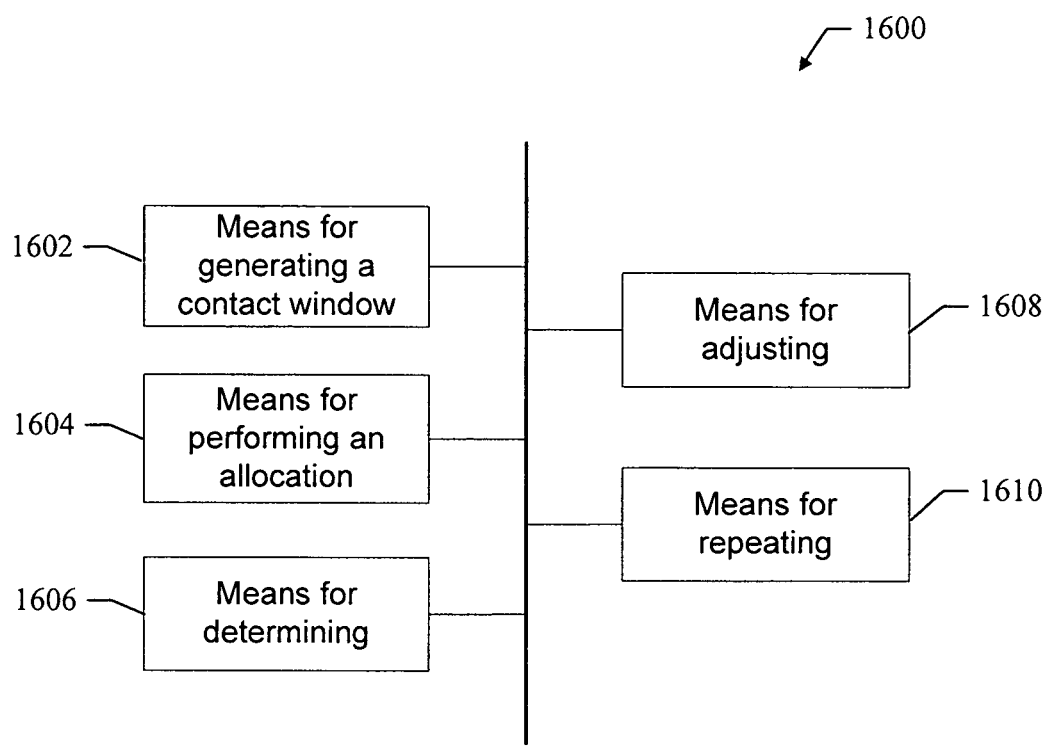
FIG. 16 shows one embodiment of SPA logic for use in embodiments of a SPA system.

FIG. 16 shows one embodiment of SPA logic 1600 for use in embodiments of a SPA system. The SPA logic 1600 comprises means 1602 for generating a contact window, means 1604 for performing an allocation, means 1606 for determining, means 1608 for adjusting, and means 1610 for repeating.

In one embodiment, the means 1602 for generating a contact window comprises hardware and/or software and operates to generate a contact window that comprises a selected time duration.

In one embodiment, the means 1604 for performing an allocation comprises hardware and/or software and operates to perform an allocation cycle to allocate a presentation to the contact window.

In one embodiment, the means 1606 for determining comprises hardware and/or software and operates to determine whether the presentation can be allocated.

In one embodiment, the means 1608 for adjusting comprises hardware and/or software and operates to adjust the selected time duration of the contact window if the presentation cannot be allocated.

In one embodiment, the means 1610 for repeating comprises hardware and/or software and operates to control the means 1604, 1606, and 1608 to repeat their operations until the presentation can be allocated.

It should be noted that the SPA logic 1600 represents just one implementation and that other implementations are possible within the scope of the embodiments.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a SPA system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for scheduling a presentation for delivery over a distribution network, the method comprising:
    generating a contact window that comprises a time period when a presentation is available for delivery to a plurality of devices, wherein delivery of the presentation to any of the plurality of devices can be initiated throughout the time period, and wherein the time period comprises a plurality of time units between a start time and an end time;
    allocating a sector bandwidth required to deliver the presentation to the plurality of devices within the contact window by:
        determining an available sector bandwidth for each of the plurality of time units of the contact window based upon an average sector throughput for each time unit of the contact window;
        performing an allocation cycle by applying a scheduling unit of the presentation for each of the plurality of time units between the end time to the start time; and
        repeating the allocation cycle until a total size of the presentation is spread among the plurality of time units within the contact window;
    determining whether the total size of the presentation can be allocated within the contact window prior to delivering the presentation to any of the plurality of devices;
    adjusting the time period of the contact window if the total size of the presentation cannot be allocated within the contact window; and
    repeating said allocating, determining and adjusting until the total size of the presentation can be allocated within the contact window.

2. The method of claim 1, wherein said adjusting comprise adjusting the start time of the contact window.

3. The method of claim 1, wherein said adjusting comprise adjusting the end time of the contact window.

4. The method of claim 1, further comprising scheduling the presentation relative to one or more other presentations based on a priority ranking.

5. The method of claim 1, further comprising reallocating the presentation within the contact window to achieve a selected uniformity factor.

6. The method of claim 5, wherein said reallocating comprising reallocating the presentation within the contact window based on a selected bandwidth deviation.

7. The method of claim 1, wherein the respective portions of the sector bandwidth required to deliver the presentation to the plurality of devices are allocated non-uniformly across the plurality of time units of the contact window and at least one portion is allocated to each of the plurality of time units.

8. Apparatus for scheduling a presentation for delivery over a distribution network, the apparatus comprising:
    logic configured to determine one or more parameters; and
    hardware logic configured to process the one or more parameters to perform a method comprising:
        generating a contact window that comprises a selected time duration comprising a plurality of time units between a start time and an end time, wherein delivery of the presentation to any of the plurality of devices can be initiated throughout the selected time duration;
        allocating a sector bandwidth required to deliver the presentation to the plurality of devices within the contact window by:
            determining an available sector bandwidth for each of the plurality of time units of the contact window based upon an average sector throughput for each time unit of the contact window;
            performing an allocation cycle by applying a scheduling unit of the presentation for each of the plurality of time units from the end time to the start time; and repeating the allocation cycle until a total size of the presentation is spread among the plurality of time units within the contact window;

determining whether the total size of the presentation can be allocated within the contact window;

adjusting the selected time duration of the contact window if the total size of the presentation cannot be allocated within the contact window; and repeating said allocating, determining and adjusting until the total size of the presentation can be allocated within the contact window.

9. The apparatus of claim 8, wherein said adjusting comprises adjusting the start time of the contact window.

10. The apparatus of claim 8, wherein said adjusting comprises adjusting the end time of the contact window.

11. The apparatus of claim 8, wherein said hardware logic is further configured for scheduling the presentation relative to one or more other presentations based on a priority ranking.

12. The apparatus of claim 8, wherein said hardware logic is further configured for reallocating the presentation within the contact window to achieve a selected uniformity factor.

13. The apparatus of claim 12, wherein said reallocating comprising reallocating the presentation within the contact window based on a selected bandwidth deviation.

14. A non-transitory computer-readable storage medium having stored thereon computer-executable instructions configured to cause a processor to perform operations to schedule a presentation for delivery over a distribution network, comprising:

generating a contact window that comprises a time interval throughout which delivery of a presentation to any of a plurality of devices can be initiated, wherein the time interval comprises a plurality of time units between a start time and an end time;

allocating a sector bandwidth required to deliver the presentation to the plurality of devices within the contact window by:

determining an available sector bandwidth for each of the plurality of time units of the contact window based upon an average sector throughput for each of the plurality of time units of the contact window;

performing an allocation cycle by applying a scheduling unit of the presentation for each of the plurality of time units from the end time to the start time; and repeating the allocation cycle until a total size of the presentation is spread among the plurality of time units within the contact window;

determining whether the total size of the presentation can be allocated within the contact window prior to delivering the presentation to each of the plurality of devices;

adjusting the selected time duration of the contact window if the total size of the presentation cannot be allocated within the contact window; and repeating said allocating, determining and adjusting until the presentation can be allocated within the contact window.

15. The non-transitory computer-readable storage medium of claim 14, wherein said instructions for adjusting are configured to perform operations comprising adjusting the start time of the contact window.

16. The non-transitory computer-readable storage medium of claim 14, wherein said instructions for adjusting are configured to perform operations comprising adjusting the end time of the contact window.

17. The non-transitory computer-readable storage medium of claim 14, further comprising instructions configured to perform operations scheduling the presentation relative to one or more other presentations based on a priority ranking.

18. The non-transitory computer-readable storage medium of claim 14, further comprising instructions configured to perform operations reallocating the presentation within the contact window to achieve a selected uniformity factor.

19. The non-transitory computer-readable storage medium of claim 18, wherein said instructions configured to perform operations reallocating comprise instructions configured to perform operations reallocating the presentation within the contact window based on a selected bandwidth deviation.

20. At least one processor configured to perform a method for scheduling a presentation for delivery over a distribution network, the method comprising:

generating a contact window that comprises a selected time duration when presentation of content is delivered over the distribution network by a content delivery system to each of a plurality of devices, wherein the time duration comprises a plurality of time units between a start time and an end time;

allocating a sector bandwidth required to deliver the presentation of content across the contact window by:

determining an available sector bandwidth for each of the plurality of time units of the contact window based upon an average sector throughput for each of the plurality of time units of the contact window;

performing an allocation cycle by applying a scheduling unit of the presentation of content for each of the plurality of time units from the end time to the start time; and repeating the allocation cycle until a total size of the presentation of content is spread among the plurality of time units within the contact window;

determining whether the total size of the presentation of content can be allocated within the contact window prior to delivering the presentation of content to any of the plurality of devices;

adjusting the selected time duration of the contact window if the total size of the presentation of content cannot be allocated within the contact window; and repeating said allocating, determining and adjusting until the total size of the presentation of content can be allocated within the contact window.

21. The method of claim 20, wherein said adjusting comprises adjusting the start time of the contact window.

22. The method of claim 20, further comprising scheduling the presentation of content relative to one or more other presentations based on a priority ranking.

23. The method of claim 20, further comprising reallocating the presentation of content within the contact window to achieve a selected uniformity factor.

24. The method of claim 20, further comprising reallocating the presentation of content within the contact window such that a total amount of traffic over a sector of the distribution network resulting from both delivery of the presentation of content and the average sector throughput is substantially equivalent across the contact window.

\* \* \* \* \*